Feb. 15, 1966 L. E. ROBINSON ETAL 3,235,211
COLLAPSIBLE TRAILER SUPPORT AND ANCHOR
Original Filed May 23, 1956 6 Sheets-Sheet 1

LESTER E. ROBINSON
GEORGE K. BRADFIELD JR.
JOHN A. JOHNSON
*INVENTORS*

BY *Samuel J Snyder*

ATTORNEY

Feb. 15, 1966 L. E. ROBINSON ETAL 3,235,211
COLLAPSIBLE TRAILER SUPPORT AND ANCHOR
Original Filed May 23, 1956
6 Sheets-Sheet 2
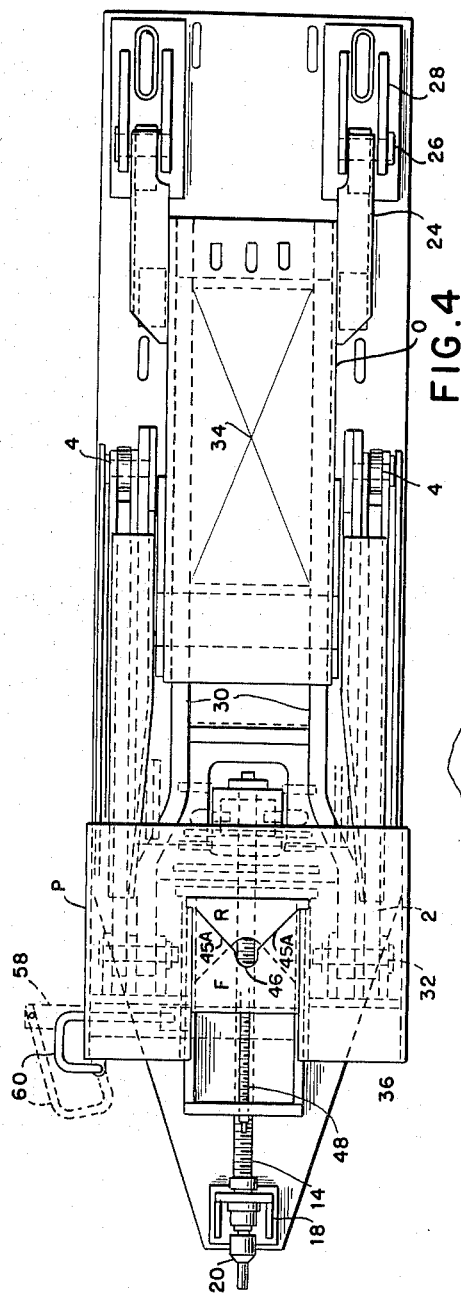
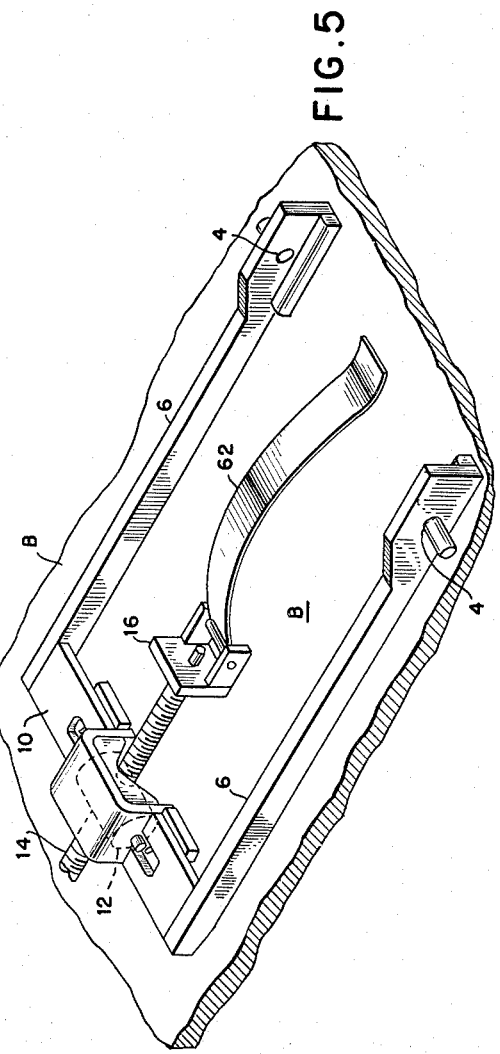
LESTER E. ROBINSON
GEORGE K. BRADFIELD JR.
JOHN A. JOHNSON
*INVENTORS*
BY *Samuel J. Snyder*
ATTORNEY

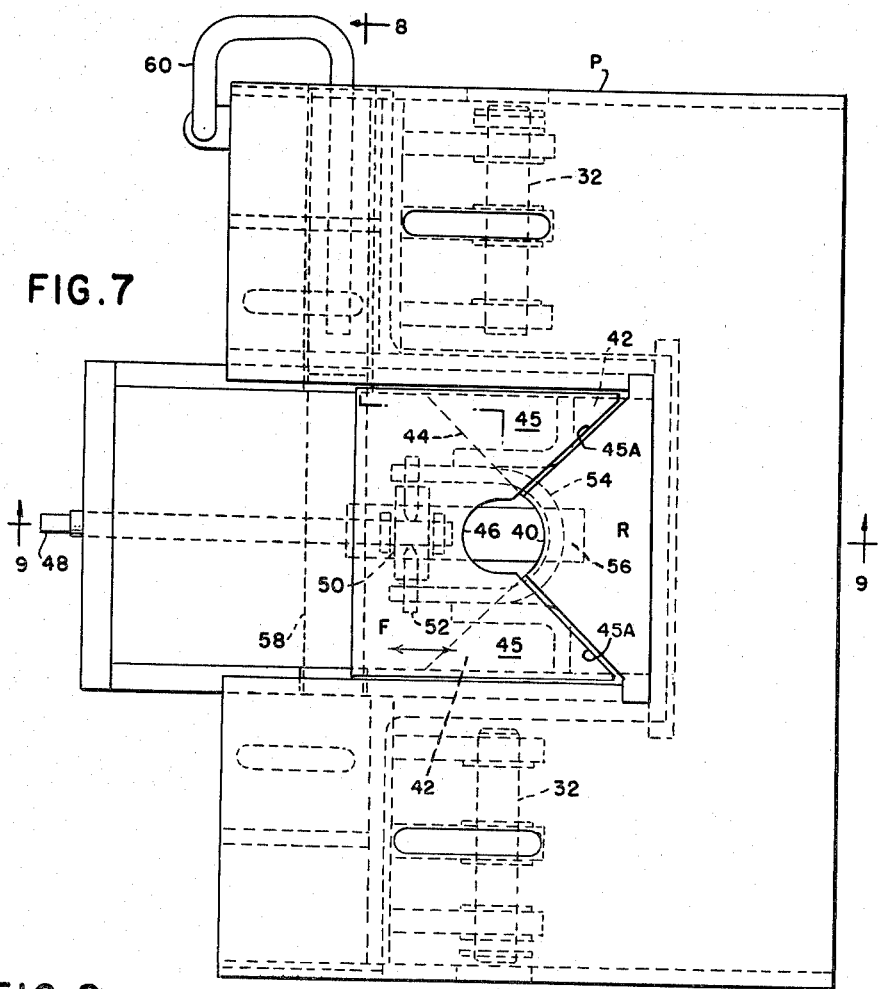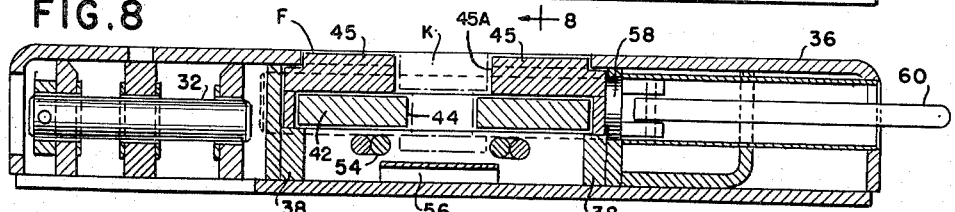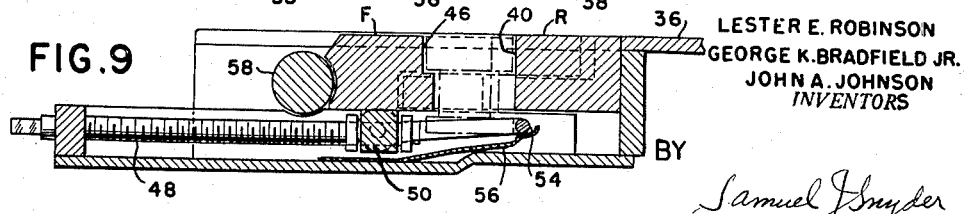

Feb. 15, 1966   L. E. ROBINSON ETAL   3,235,211
COLLAPSIBLE TRAILER SUPPORT AND ANCHOR
Original Filed May 23, 1956
6 Sheets-Sheet 5

LESTER E. ROBINSON
GEORGE K. BRADFIELD JR.
JOHN A. JOHNSON
INVENTORS

BY Samuel J Snyder
ATTORNEY

Feb. 15, 1966 L. E. ROBINSON ETAL 3,235,211
COLLAPSIBLE TRAILER SUPPORT AND ANCHOR
Original Filed May 23, 1956 6 Sheets-Sheet 6
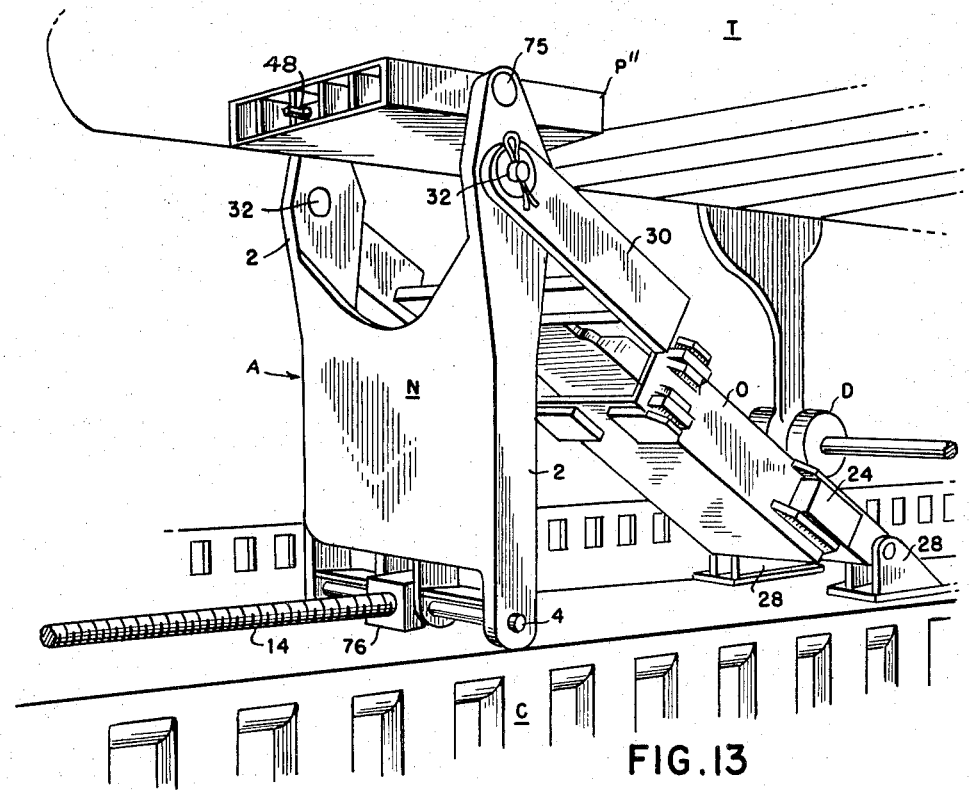
FIG.13
FIG.14
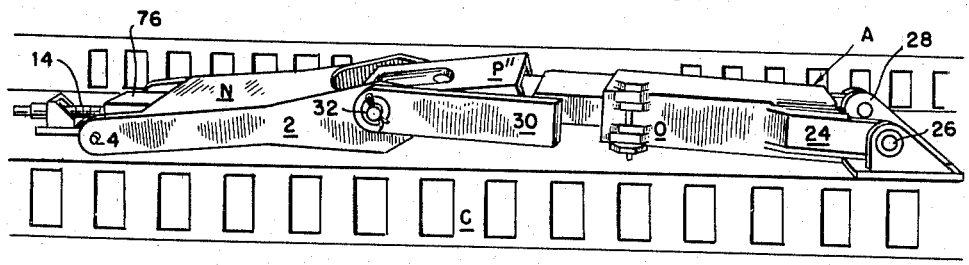
LESTER E. ROBINSON
GEORGE K. BRADFIELD JR.
JOHN A. JOHNSON
INVENTORS
BY *Samuel J. Snyder*
ATTORNEY

United States Patent Office 3,235,211
Patented Feb. 15, 1966

3,235,211
COLLAPSIBLE TRAILER SUPPORT AND ANCHOR
Lester E. Robinson, Short Hills, George K. Bradfield, Jr., Maywood, and John A. Johnson, Short Hills, N.J., assignors of two-thirds to ACF Industries, Incorporated, New York, N.Y., a corporation of New Jersey, and one-third to The Rail Trailer Company, Chicago, Ill., a corporation of Delaware
Application June 9, 1959, Ser. No. 819,192, now Patent No. 3,145,006, dated Aug. 18, 1964, which is a continuation of application Ser. No. 586,835, May 23, 1956. Divided and this application June 4, 1964, Ser. No. 372,564
10 Claims. (Cl. 248—119)

This application is a division of our application Ser. No. 819,192, filed June 9, 1959 which has become Patent No. 3,145,006, dated Aug. 18, 1964, and which is, in turn, a continuation of our previous application Ser. No. 586,835, filed May 23, 1956, now abandoned.

This invention relates generally to a support and anchor for highway trailers but in particular to supports and anchors of the collapsible and resilient controlled type.

Highway trailers have been transported on railway cars, ships and other structure by rigidly anchoring the trailer to the supporting structure in attempts to prevent any movement of the trailer underframe or road supporting wheels. With this type of support and anchor the lading carried in the trailer may shift under impact or shock and damage the trailer super-structure. Previous structures frequently required side loading of the trailers which is both slow and costly, both in time and terminal facilities. Accordingly, an object of the present invention is the provision of a support and anchor device which can be driven over by the tractor and trailer without any interference, yet which can be quickly operated to a raised position by a single operator after the trailer is approximately positioned.

A further object of the invention is the provision of a support and anchor for the forward end of a highway trailer resting on its road wheels and which support permits resiliently controlled movement of the trailer upon its road wheels.

A still further object of the invention is the provision of a support and anchor device which can be power raised from a lowered to a raised position lifting the forward end of the trailer off of its temporary supporting dolly wheels.

A yet further object of the invention is the provision of a collapsible trailer support and anchor having a positive lock for engaging the trailer kingpin which lock includes gathering or trailer moving features permitting locking of the trailer without necessity of extremely accurate spotting of the trailer with respect to the support and anchor device by the tractor. The support and anchoring device performs the function of perfectly spotting an imperfectly spotted trailer, and then securing it.

These and other objects of the invention will be apparent from a study of the following description and accompanying drawings in which:

FIG. 4 is a plan view of the device of FIG. 3.

FIG. 5 is a partial perspective of the operating means to raise the device.

FIG. 7 is an enlarged plan view of the trailer supporting platform and anchor.

FIG. 8 is a sectional view taken substantially on line 8—8 of FIG. 7.

FIG. 9 is a sectional view taken substantially on line 9—9 of FIG. 7.

FIG. 13 is a perspective view of a modification of the preferred device of FIG. 2, and FIG. 14 is a perspective view of the device of FIG. 13 when in the collapsed or folded position.

Figure 1:
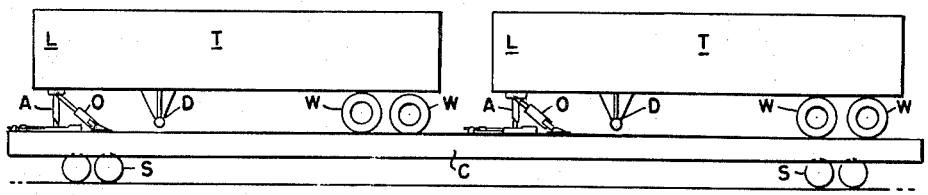
FIG. 1 is a diagrammatic elevational view of a railway car carrying two trailers anchored in place by the improved anchoring device.

Referring now to the drawings in detail it will be seen from FIG. 1 that a pair of trailers T have their road wheels W resting upon and supported by the floor of a supporting structure such as railway car C which in turn is carried upon its rail wheels S. The forward end L of each trailer is supported upon the collapsible device or mast A which will raise the dolly wheels D out of contact with the supporting structure upon which the trailer is supported.

As clearly shown, the support and anchoring device is formed with a first leg or member N, a second leg or member O and a trailer supporting platform and lock device P, the device being movably mounted with respect to a base B which may be the car floor or other supporting structure or may be a base adapted to be attached to the car floor or other supporting structure.

The leg member N when in the raised position is substantially vertical and is formed either as a trussed weldment or as a casting having side pieces 2, the lower ends of which are pierced as to receive a pivot pin 4. This pivot pin extends, in the form in FIGS. 1–6 inclusive, through the ends of slide bars 6 comprising a yoke slidably mounted on the base and held in place by inner and outer guide members 7 and 8, respectively. The ends of slide pieces 6 remote from pins 4 are joined by cross piece 10 in which is mounted a nut 12, this nut engaging a threaded shaft 14 having its one end rotatably carried in bracket 16 mounted on the base or floor B and its other end rotatably carried in a bracket 18 also fixed to the floor or base member B. The end of the shaft 14 adjacent bracket 18 is provided with an end 20 adapted to receive a power wrench (not shown). Operation of the screw 14 will, of course, move nut 12 therealong together with connected slides 6 and pivot pins 4.

Figure 2:
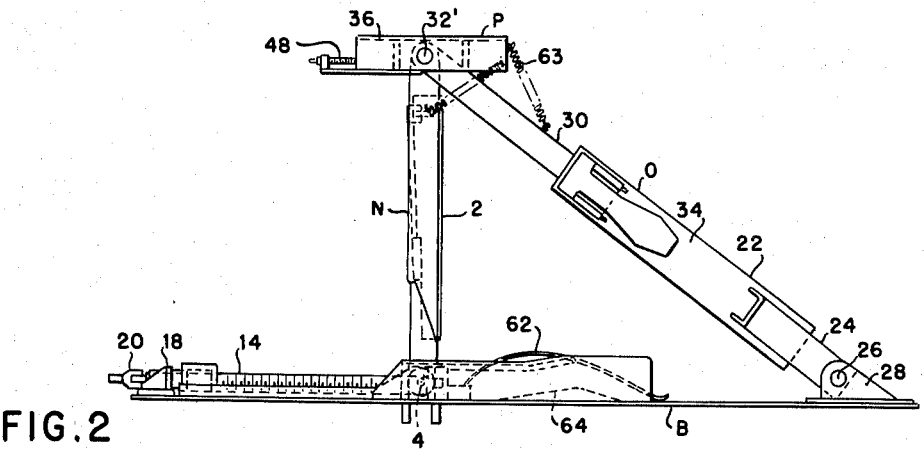
FIG. 2 is a side elevational view of a preferred anchoring device in the raised position.

The second leg or member O is also movably mounted with respect to the base or floor B at one end and is pivotally connected at the remote end to the end of leg or member N as clearly shown in FIG. 2. The member O is preferably made in two parts of either weldments or castings and the lower part 22 is provided with arms 24 joined by pivot pins 26 to brackets 28 welded or otherwise secured to the base or floor B. The top or second part 30 of the leg or member O has its upper ends spread and pivotally connected to leg N by pivot pins 32. The lower end of upper member 30 extends into the upper end of lower member 22 and is joined to the lower member by a resilient device 34 (shown merely by X line in FIG. 4) and which resilient device operates to resist both inward and outward movement of the top member 30 with respect to the lower member 22. In other words, the resilient device can absorb shocks in either direction and in a resilient manner.

Figure 6:
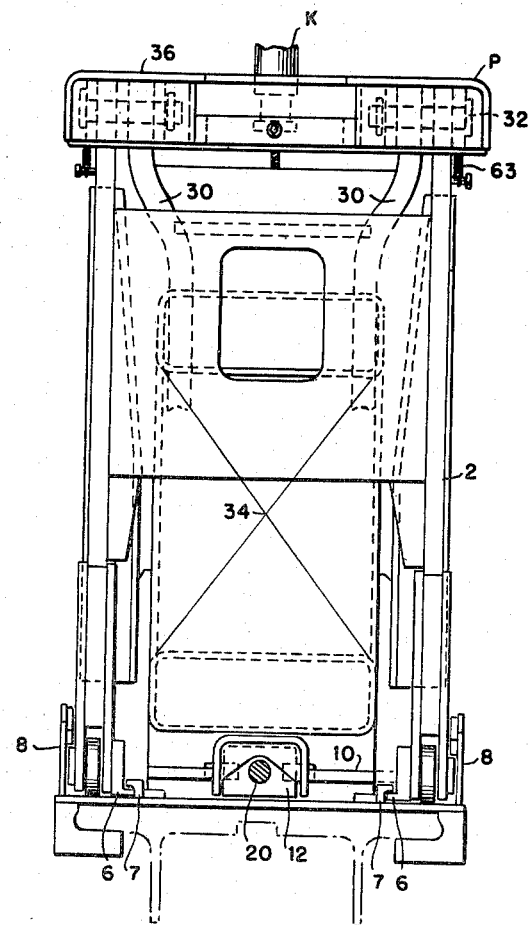
FIG. 6 is a front end elevational view of the device.

As clearly shown in FIGS. 2, 4 and 6 pivot pins 32 also support pivotally the trailer supporting platform P. The trailer supporting platform P is of generally box formation having a flat top surface 36 adapted to be lubricated and engage the under surface of the elevated forward supporting plate of the trailer. This box like platform is suitably trussed and braced to receive the loads imparted thereto and is provided centrally with guides 38 to which may be welded or otherwise secured a fixed block or lock member R having a kingpin receiving substantially semicylindrical surface 40 formed in the forward vertical surface thereof. This fixed kingpin receiving block has forwardly extending wings 42 having vertical kingpin guiding surfaces 44 extending laterally and longitudinally outwardly from surface 40, the wings 42 providing a support for similar wings 45 carried by the movable block or lock member F and overlapping the wings 42 in the closed position of the blocks F, R, illustrated in FIGURES 4 and 7. Wings 45 have the vertical kingpin guiding surfaces 45A extending laterally and longitudinally outwardly from surface 46. The member F is also provided with a kingpin receiving substantially semicylindrical vertical surface 46. These surfaces 40 and 46 are shaped to conform to the trailer kingpin K shown in FIGS. 6 and 8 and together form a securing socket therefor. Surfaces 44 and 45A extend longitudinally and laterally outwardly from the surfaces 40, 46. In order to move the movable jaw or block F a screw thread shaft 48 is provided rotatably mounted at its ends in platform P and engaging a nut 50. This nut 50 is attached to the movable block F so that rotation of the screw will move block F directly away from and towards surface 40. Also, nut 50 is provided with projecting pins 52 upon which are pivotally mounted the ends of a U-shaped yoke 54 adapted to engage the lower end of kingpin K and move the kingpin with the movable block F. Thus, in moving the movable block F to an unlocked position the yoke 54 will, through the kingpin, pull the entire trailer resting upon its road wheels forward so that the fixed block will clear the kingpin upon lowering of the supporting platform through the power operating end 20. Likewise, the movable block F will shift the trailer rearwardly in case the trailer has been imperfectly spotted. In order that loop 54 will be raised and conditioned for an unlocking operation a spring member 56 is provided as shown in FIGS. 8 and 9. While the shaft 48 will have self-locking threads it is desirable to positively lock the movable block F against accidental displacement and this is done by means of a lock bar 58 slidably carried in the platform and operated by means of a locking handle 60 which may be sealed to the platform.

Figure 3:
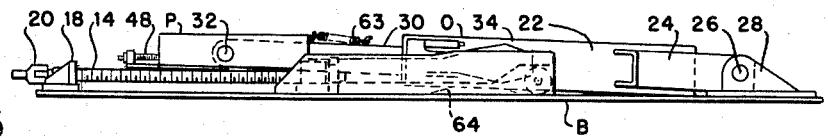
FIG. 3 is a side elevational view of the device in a collapsed position.

In operation and assuming that the support and locking device is in the collapsed position shown in FIG. 3 the trailer will be backed over the collapsed device, until the kingpin K is in approximately the correct position, then the tractor will be uncoupled with the trailer resting on its dolly wheels D. An operater will then attach either a hand or power wrench to the end 20 of screw 14. Rotation of this screw in the proper direction will pull the slides 6 toward bracket 18 imparting a thrust on the lower end of leg N through pins 4. To assist in starting the lifting movement a spring 62, best shown in FIG. 5, is provided which is compressed when the device is in its lowered position of FIG. 3. Continued rotation of operating shaft 14 will bring the leg N to a substantially vertical position and the two part resilient leg O to a diagonal position with the platform P being held in a substantially horizontal position by balancing springs 63. With the supporting device in this position, rotation of screw shaft 48 will cause movement of forward block F toward the rear and will shift the entire trailer on its road wheels to a position where the trailer kingpin is firmly engaged by surfaces 40 and 46 and in overlapping relation to the enlarged lower end of the kingpin K. With the trailer in this position the dolly wheels D will be clear of the supporting floor or base B and any shocks imparted to the supporting structure such as C will allow the trailer to move longitudinally upon its road wheels W. This movement of the trailer will cause vertical leg N to oscillate, lowering or raising platform P. The oscillations are under positive control of the resilient device 34 carried in the two part leg O. It will be seen that as the platform is lowered by rocking or oscillation of end L of the trailer the resilient device 34 will be compressed, but in returning the parts to their normal position the resilient device 34 will have to lift the forward end of the trailer thus serving to dampen the return of the resilient device 34 to its normal position. The resilient device will, of course, be prestressed to eliminate all slack and to normally hold the leg N in a substantially vertical position with the intended trailer load supported on platform P.

It will also be noted, particularly in connection with FIGS. 2 and 3, that a small cam surface 64 is provided intermediate the down and raised position so that leg N will rise at a more nearly constant rate and will give greater lifting power to lift the trailer off of its dolly wheels during movement to the fully raised position.

Figure 10:
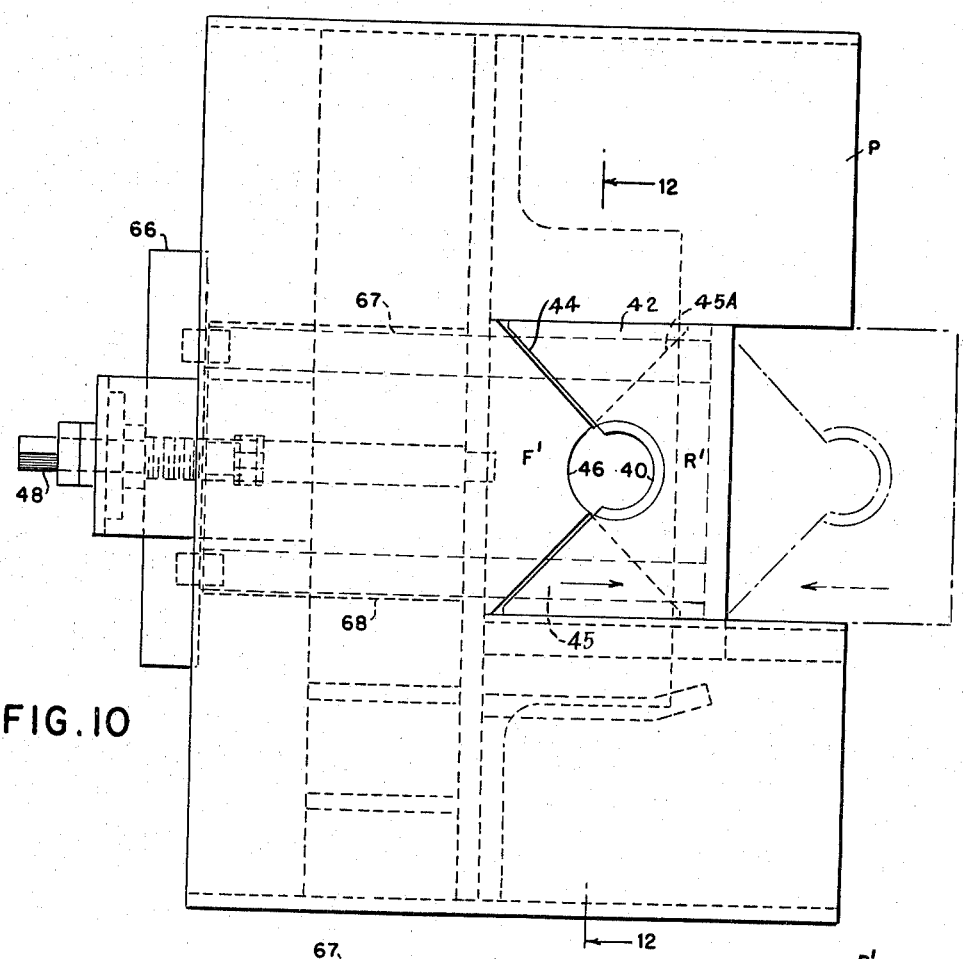
FIG. 10 is a plan view similar to FIG. 7 but showing a slight modification of the locking means for the trailer supporting platform.
Figure 11:
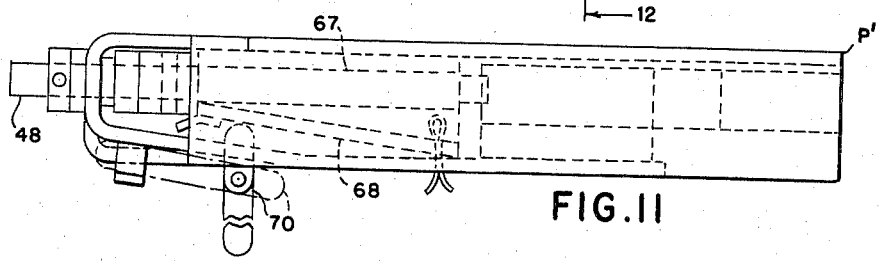
FIG. 11 is a side view of the platform of FIG. 10.
Figure 12:
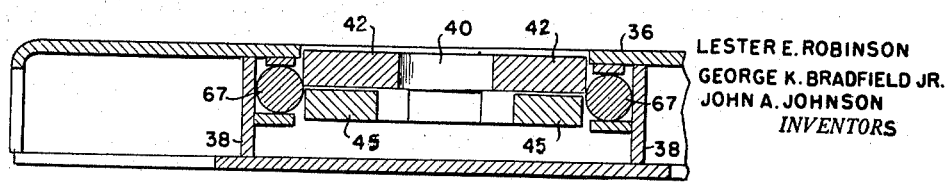
FIG. 12 is a sectional view taken substantially on line 12—12 of FIG. 10.

Referring now to the modification shown in FIGS. 10, 11 and 12 it will be seen that shifting loop 54 can be eliminated by reversing the relative location of the fixed and movable blocks. The platform P is substantially the same as platform P previously referred to but the fixed block F of the lock is in the forward position while the movable block R is in the rearward position. The blocks are of the same general construction as that previously described in connection with FIGS. 7, 8 and 9 and the same reference numerals suitably modified have been applied.

In the form shown in FIGS. 10, 11 and 12 the operating screw 48 carries a yoke 66 to which is attached push rods 67 extending through the trussed frame of platform P and being secured to the rear movable block R. Rotation of the screw 48 will cause the yoke 66 to shift toward the rear with respect to the trailer and move the movable block R from the closed full line position to the dotted line position of FIG. 10. In this case the block R will of itself pull the entire trailer forward when being moved from the dotted position to the full line position and when the movable block R is moved from the full to the dotted line position in unlocking the trailer it is not necessary to shift the trailer as in the form shown in FIGS. 7, 8 and 9 due to the fact that during lowering of the mast or supports the fixed forward block F will move away from the kingpin K instead of toward the kingpin as is the case with the fixed block R in the form shown in FIGS. 7, 8 and 9. In order to lock the yoke 66 against any possible movement a pair of bars 68 may be loosely pinned to the platform and raised or lowered under control of an operating lock shaft 70. In the raised position as shown in FIG. 11, the bars 68 block any possible movement of yoke 66 in an unlocking direction.

The two forms of platform P, illustrated in FIGURES 1–12 thus comprise kingpin engaging and securing means which can encompass the kingpin of an imperfectly spotted trailer and forcefully actuate the trailer through the kingpin to perfectly spotted position, in which position the kingpin is moreover secured in the kingpin securing socket of the platform.

In the modified form as shown in FIGS. 13 and 14 the upper ends of two part resilient member O are connected by the same type of pivotal pins 32 to the upper ends of arms 2 of leg member N, but in this form the leg members 2 extend beyond pivots 32 to a pivotal connection 75 with platform P which may be either of the type shown in FIGS. 7, 8 and 9 or that shown in FIGS. 10, 11 and 12. In order to operate the leg or support member N, the pins 4 are extended to engage a nut 76 mounted on the operating screw 14 having its ends journalled in brackets in the same manner as that previously described in connection with FIG. 2. In this form however, rotation of the screw 14 causes the lower end of leg N to move away from the lower end of leg O to the collapsed position shown in FIG. 14. In other words the operating means of FIGS. 13 and 14 move the lower ends of legs N away from brackets 28 whereas in the form of FIGS. 2 and 3 the lower ends of leg N move toward the brackets 28 during collapsing.

While the device has been described particularly with reference to its mounting on a railway car it is obvious that the device can be either directly mounted on the floor of a transport structure such as a railway car or ship or it may be mounted on a base plate which in turn may be secured to any supporting structure such as a railway car or ship. In any case the trailer can move longitudinally on its road wheels to absorb shock but under control of the resilient device carried in the diagonal strut and controlling the oscillations of the upper end of the vertical strut or leg.

While the invention has been described more or less in detail it will be obvious to persons skilled in the art that various modifications and forms other than those shown may be made without departing from the scope of the following claims defining our invention.

What is claimed is:

1. In a device for securing a trailer to an elongated transporting vehicle and including a platform having an upper surface engageable with an elevated forwardly located under surface of said trailer for supporting the forward end of said trailer, said trailer further having a depending kingpin, the combination of means for elevating said platform by swinging the same in a vertical arc extending longitudinally of said vehicle with trailer spotting and securing means comprised by said platform, said last mentioned means including forward and rear kingpin engaging and securing socket means and forward and rear kingpin guide surface means, said engaging and securing socket and guide surface means being movable relative one to the other longitudinally of said vehicle from an open position encompassing the kingpin of an imperfectly spotted trailer to a closed position in which said kingpin engaging and securing socket means constitute a kingpin socket securing said kingpin in said platform, said kingpin engaging and securing and guide surface means in moving from open to closed position actuating said kingpin from imperfectly to perfectly spotted position, said kingpin spotting means further including means for forcefully moving said socket and guide means from one position to the other.

2. A support and anchor device for supporting a trailer and securing the same to a supporting structure, said trailer having road wheels, an elevated under surface and a depending kingpin, said device comprising an elongated base secured to said structure, a leg pivoted at one of its ends to said base and having a lowered position extending longitudinally thereof and substantially parallel thereto, a second leg pivoted at one of its ends to the other end of said first leg and having a lowered position extending longitudinally of said base and substantially parallel thereto, a platform mounted on said legs and having an upper surface adapted to support said elevated under surface, said platform further comprising means for engaging and securing said kingpin, said device further comprising means connected to the other end of said second leg for moving said last mentioned end longitudinally relative to said base to raise said legs and platform to operative position, said kingpin engaging and securing means including a first block formed with a substantially semi-cylindrical kingpin engaging surface and a wing on each side of said semi-cylindrical surface, each wing having a kingpin guiding surface extending laterally and longitudinally outwardly from said semi-cylindrical surface, a second block formed with a substantially semi-cylindrical kingpin engaging surface facing said first mentioned such surface, said second block further having a wing on each side of its semi-cylindrical surface, each last mentioned wing having a kingpin guiding surface extending laterally and longitudinally outwardly from said semi-cylindrical surface of said second block, said engaging and securing means further comprising means for forcefully moving one of said blocks away from and toward the other of said blocks, the wings of one of said blocks overlapping the wings of the other block when said blocks are moved together and said semi-cylindrical surfaces together constituting a substantially cylindrical socket for said kingpin when said blocks are moved together, whereby said blocks when moved apart may encompass the kingpin of an imperfectly spotted trailer and upon said blocks being moved together, said trailer through said kingpin is moved to perfectly spotted position and said kingpin is secured in position in said platform.

3. A support and anchor device for supporting a trailer and securing the same to a supporting structure, said trailer having road wheels, an elevated undersurface and a depending kingpin, said device comprising an elongated base secured to said structure, a leg pivoted at one of its ends to said base and having a lowered position extending longitudinally thereof and substantially parallel thereto, a second leg pivoted at one of its ends to the other end of said first leg and having a lowered position extending longitudinally of said base and substantially parallel thereto, a platform mounted on said legs and having an upper surface adapted to support said elevated under surface, said platform further comprising means for engaging and securing said kingpin, said device further comprising means connected to the other end of said second leg for moving said last mentioned end longitudinally relative to said base to raise said legs and platform to operative position, said kingpin engaging and securing means including a first block formed with a substantially semi-cylindrical kingpin engaging surface and a wing on each side of said semi-cylindrical surface, each wing having a kingpin guiding surface extending laterally and longitudinally outwardly from said semi-cylindrical surface, a second block formed with a substantially semi-cylindrical kingpin engaging surface facing said first mentioned such surface, said second block further having a wing on each side of its semi-cylindrical surface, each last mentioned wing having a kingpin guiding surface extending laterally and longitudinally outwardly from said semi-cylindrical surface of said second block, said engaging and securing means further comprising means for forcefully moving one of said blocks away from and toward the other of said blocks, the wings of one of said blocks overlapping the wings of the other block when said blocks are moved together and said semi-cylindrical surfaces together constituting a substantially cylindrical socket for said kingpin when said blocks are moved together, whereby said blocks when moved apart may encompass the kingpin of an imperfectly spotted trailer and upon said blocks being moved together, said trailer through said kingpin is moved to perfectly spotted position and said kingpin is secured in position in said platform, said semi-cylindrical surface of said first block facing toward the pivoted end of said first leg and moving longitudinally of said trailer away from said kingpin as said platform is lowered.

4. Trailer supporting, spotting and securing device for a trailer having an elevated undersurface and a depending kingpin, said device including a leg having an end pivoted to a lower supporting member and swingable from a lower position to an upper position extending angularly upwardly from said member, means for actuating said leg between said two positions, a platform mounted on the other end of said leg and including a block formed with a kingpin engaging substantially vertical arcuate surface facing the pivoted end of said leg, said platform further comprising a portion formed with a substantially vertical arcuate kingpin engaging surface facing said first kingpin engaging surface, said portion being movable toward and away from said first kingpin engaging surface, said platform and said block further having kingpin guiding surfaces extending laterally and longitudinally outwardly from said two kingpin engaging surfaces respectively, and means for forcefully actuating said movable portion of said platform.

5. A lading container supporting, spotting and securing device comprising a platform, said platform comprising a first block formed with a substantially semi-cylindrical kingpin engaging surface and having a wing extending on each side of said surface and formed with a kingpin guiding surface extending laterally and longitudinally outwardly from said semi-cylindrical surface, a second block slidably mounted in said platform for movement toward and away from said first block, said second block being formed with a substantially semi-cylindrical kingpin receiving surface in opposed juxtaposition to said first semi-cylindrical surface and said second block having a wing extending on each side of said second semi-cylindrical surface and formed with a kingpin guiding surface extending laterally and longitudinally outwardly from said second semi-cylindrical surface, said second block further comprising a loop pivotally connected thereto, said loop being proportioned and arranged to encompass the kingpin of a trailer and to draw said kingpin out of said semi-cylindrical surface of said first block upon said second block being moved out of closed position immediately adjacent said first block, actuating means for moving said second block toward and away from said first block, and deflector means mounted on said platform and moving said loop into kingpin encompassing position when said second block is in closed position.

6. Anchor platform for supporting, spotting and securing a trailer to a supporting structure, said trailer having road wheels, an elevated under surface and a depending kingpin, said platform having an upper surface for engagement with said elevated under surface, said platform further comprising means for engaging and securing said kingpin, said kingpin engaging and securing means including a first block formed with a substantially semi-cylindrical kingpin engaging surface and a wing on each side of said semi-cylindrical surface, each wing having a kingpin guiding surface extending laterally and longitudinally outwardly from said semi-cylindrical surface, a second block formed with a substantially semi-cylindrical kingpin engaging surface facing said first mentioned such surface, said second block being movable directly towards and away from said first mentioned kingpin engaging surface, said second block further having a wing on each side of its semi-cylindrical surface, each last mentioned wing having a kingpin guiding surface extending laterally and longitudinally outwardly from said semi-cylindrical surface of said second block, said engaging and securing means further comprising means for forcefully moving one of said blocks away from and toward the other of said blocks, the wings of one of said blocks overlapping the wings of the other block when said blocks are moved together and said semi-cylindrical surfaces together constituting a substantially cylindrical socket for said kingpin when said blocks are moved together, whereby said blocks when moved apart may encompass the kingpin of an imperfectly spotted trailer and upon said blocks being moved together, said trailer through said kingpin is moved to prefectly spotted position and said kingpin is secured in position in said platform.

7. A support and anchor device for supporting a trailer and securing the same to a supporting structure, said trailer having road wheels, an elevated under surface and a depending kingpin, said device comprising a platform having an upper surface adapted to support said elevated under surface, said platform further comprising means for engaging and securing said kingpin, said kingpin engaging and securing means including a first block formed with a kingpin engaging surface and kingpin guiding surfaces extending laterally and longitudinally outwardly from said kingpin engaging surface, a second block formed with a kingpin engaging surface facing said first mentioned such surface, said second block further having on each side of its kingpin engaging surface a kingpin guiding surface extending laterally and longitudinally outwardly from said kingpin engaging surface of said second block, said engaging and securing means further comprising means for forcefully moving one of said blocks away from and toward the other of said blocks, the guiding surfaces of one of said blocks overlapping the guiding surfaces of the other block when said blocks are moved together and said kingpin engaging surfaces together constituting a socket for said kingpin when said blocks are moved together, whereby said blocks when moved apart may encompass the kingpin of an imperfectly spotted trailer and upon said blocks being moved together, said trailer through said kingpin is moved to perfectly spotted position and said kingpin is secured in position in said platform.

8. In a railway flatcar, a device for securing a trailer kingpin or the like, comprising a first block formed with a surface having a recess therein for receiving the kingpin, a second block formed with a surface having a recess therein in opposed longitudinal juxtaposition with respect to said recess in said first block, loop means pivotally mounted at its ends adjacent the ends of the recess on one of said blocks and dimensioned and positioned to loop the lower end of the kingpin, and actuating means associated with said blocks for varying the distance between said recesses and causing the loop means to move the kingpin away from the other block.

9. A securing device according to claim 8, wherein said first block is stationary, said second block is movable, said loop is mounted on said movable block, and a deflector is secured to said first block to move said loop into position to engage the kingpin when said blocks are in kingpin securing position.

10. In a flat car, a horizontal head plate for supporting the front end of a trailer, said head plate being provided with a rearwardly opening slot adapted to receive the kingpin of the trailer at its base, said kingpin being insertable into and withdrawable from said slot through the open rear end thereof, a forward locking block, a movable rear locking block having a portion receivable in said slot, said blocks having complementary notches for embracing the neck of said kingpin, and releasable means for holding said movable locking block in operative position said slot and the block portion received therein have interengaging side faces converging toward the base of the slot.

References Cited by the Examiner

UNITED STATES PATENTS

| | | | |
|---|---|---|---|
| 2,093,761 | 9/1937 | Kramer | 105—368 |
| 2,880,681 | 4/1959 | Markestein et al. | 105—368 |
| 2,936,983 | 5/1960 | Markestein et al. | 248—119 |
| 3,035,801 | 5/1962 | Mangels | 248—119 |
| 3,041,028 | 6/1962 | McDowell | 248—119 |
| 3,081,115 | 3/1963 | Dickey et al. | 287—20 |
| 3,087,748 | 4/1963 | Livelsberger et al. | 287—20 |
| 3,145,006 | 8/1964 | Robinson et al. | 248—119 |

CLAUDE A. LE ROY, *Primary Examiner.*

FRANK L. ABBOTT, *Examiner.*